Jan. 27, 1948.  R. KELLER  2,434,932
LOAD REGULATION OF SYNCHRONOUS MACHINES
Filed Dec. 6, 1943
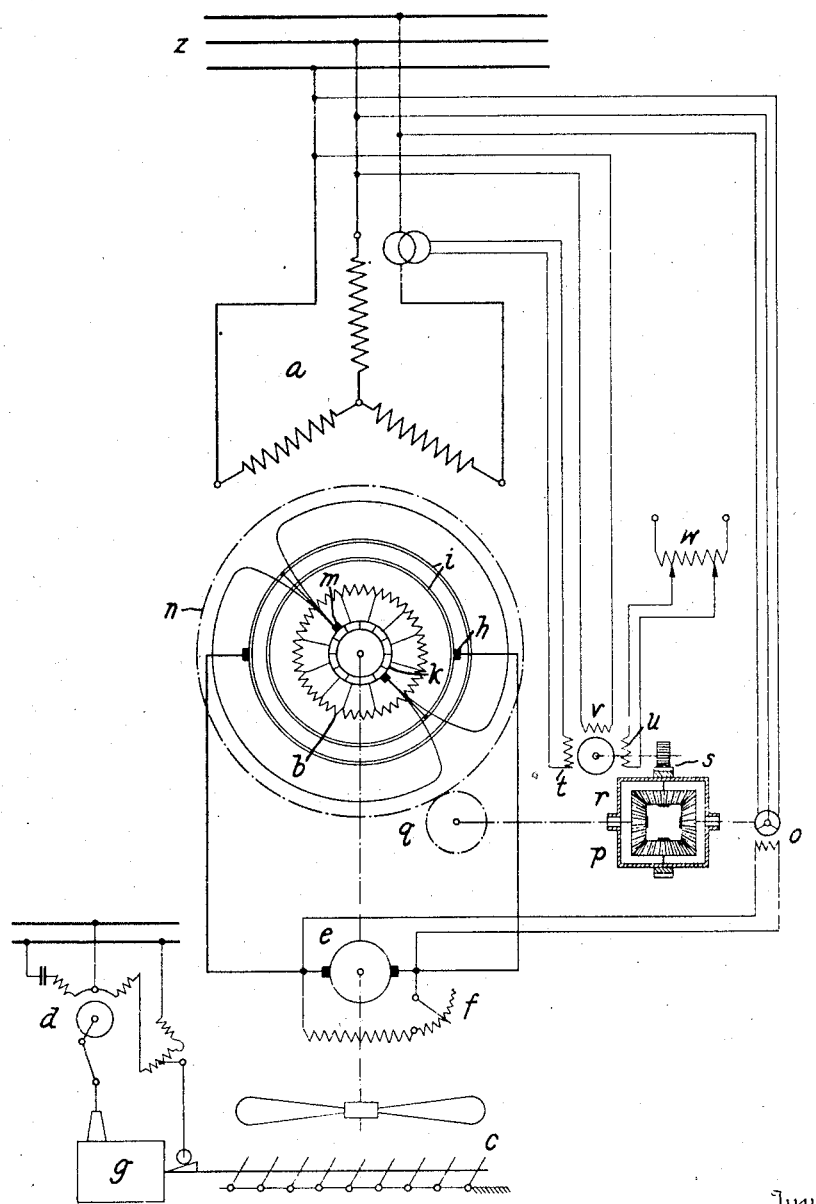
Inventor:
Robert Keller,
By Pierce & Scheffler,
Attorneys.

Patented Jan. 27, 1948

2,434,932

UNITED STATES PATENT OFFICE 2,434,932

LOAD REGULATION OF SYNCHRONOUS MACHINES

Robert Keller, Ennetbaden, Switzerland, ass'gnor to Aktiengesellschaft Brown, Boveri & Cie, Baden, Switzerland Application December 6, 1943, Serial No. 513,127
In Switzerland October 7, 1942

8 Claims. (Cl. 172—246)

The parallel operation of synchronous machines over long lines can hardly be improved by such means as choke coils and the like. An improvement is more likely if the machines employed are given fundamentally different characteristics. For parallel operation with the synchronous machines of a generator station a non-synchronous generator would receive first consideration, this generator having a stable characteristic as regards power and speed but the disadvantage that it absorbs a large reactive load. In order to produce this reactive load special machines, such as synchronous or commutator machines, are, however, required and these supplementary generators complicate the plant.

It is also known to distribute the load between synchronous machines by altering the angle between the inducing excitation field and the induced alternating or rotating field during operation. With machines having a rotating excitation field this can be achieved by also allowing the stator to rotate, by using two groups of excitation poles with separate regulation, or by inserting a variable supplementary voltage produced inside or outside the machine and phase-displaced with regard to the line or generator voltage. In this connection it has been proposed to construct the rotor or field winding of the machine as a closed direct-current rotor winding with a number of taps and for the purpose of regulating the load to allow a travelling contact to move along a regulating resistance located between these taps. If the travelling contact is at rest the loading of the machine in question will be constant. With larger machines such a resistance will, however, be of a considerable size and thus detrimentally affect the efficiency of the machine.

An object of the present invention is to provide a synchronous electric machine, which may be a motor or a generator, that is adapted for operation in parallel with other machines by the inclusion within the machine itself of mechanism for varying the angular displacement of the rotating stator field and the rotating rotor field to regulate the load carried by the machine. An object is to provide a synchronous electric machine having stator windings, a closed rotor winding with tapped connections to a commutator having brushes for the direct-current excitation of the rotor winding, and mechanism for shifting the brushes to regulate the load carried by the machine. More specifically, an object is to provide an alternating current generator having stator windings, a closed rotor winding excited by direct current, and mechanism for automatically varying the angular relation of the rotating fields of said stator windings and rotor windings to regulate the load carried by the generator.

According to the invention, the exciter rotor is provided with a direct-current winding which is connected to a commutator, and also two slip rings for the conduction of the current. The brushes on the commutator are each connected to a slip ring and driven at a speed equal to that of the synchronous rotating field of the machine. The magnetic axis of the rotor can be rotated very gradually by displacing the commutator brushes relative to the magnetic axis of the rotating field of the stator so that the input or output of the machine can be regulated.

In practice the regulation is made automatic, a constructional example of such an arrangement being shown in the accompanying drawing. According to this arrangement the synchronous generator whose stator winding $a$ is connected to the network $z$ and which has a rotor winding $b$ is driven by the hydraulic turbine $c$. On the shaft of the generator is an exciter $e$ with a field regulator $f$. The motive fluid supplied to the turbine $c$ is controlled by an electrical speed governor $d$ which actuates the servomotor $g$. The excitation current is supplied to the rotor $b$ of the generator over the stationary brushes $h$, slip rings $i$, rotatable brushes $m$ and the commutator $k$. This latter is connected to the winding $b$, whilst the commutator brushes $m$ are electrically insulated and connected mechanically with the movable brush holder yoke $n$. This latter is actuated by the synchronous motor $o$ over the differential gearing $p$ and reduction gearing $q$ whose transmission ratio is equal to the ratio of the pole number of the machines $a$ and $o$. The differential gearing $p$ is affected by the action of the regulator $r$ whose system of rotation can displace the housing of the gearing $p$ by means of the gearwheels $s$ and which remains at rest when the field produced in the regulator coil $t$ by the effective current of the generator $a$ is equal to the field produced in the coil $u$. The field in the coil $u$ is produced by the voltage taken from the adjustable resistor $w$. If due to a difference in the excitation a field is produced in the direction of the coils $t$ and $u$, then this field together with the phase-displaced field of coil $v$ produces a torque in the system of rotation of the regulator $r$.

The method of operation of the arrangement described is as follows. Since the speed of rotation of the brush holder yoke $n$ must necessarily be the same as that of direct-current excited rotor $b$, the machine operates as a synchronous machine. The spatial position of the rotating stator field is, however, determined by the network $z$ so that the loading of the machine arranges itself according to the angle which is formed by the rotating stator field and the rotating rotor field, on condition that the turbine is automatically regulated to this load by the regulator $d$. The machine load is zero, that is the machine runs light, when the stator and rotor field axis coincide. If the rotor is advanced the machine operates as a generator, whilst if it is retarded it operates as a motor. If there is for instance a sudden increase in load regulator $r$ will first of all come into operation and cause the brushes $m$ to be advanced by the action of the differential gearing $p$ so that the generator takes over more load; since the generator at the same time tends to remain behind as regards its speed, regulator $d$ causes the inlet valve of the turbine to be opened correspondingly further. Stability is maintained even during sudden changes because although the displacement of the brushes may be delayed this is equalized by the large rotating masses which are generally subjected to much greater accelerations and retardations. The regulating devices which by comparison with the aforesaid masses are very light, especially the brush moving apparatus ensure not only a high static stability but also a large dynamic stability, which latter can be still further improved by suitable damping devices.

Whilst the effective power can be adjusted by moving the contacts on the regulating resistance or transformer $w$, if necessary automatically in dependence on other values or in accordance with a definite programme, the wattless load can be regulated by means of the shunt regulator $f$ of the exciter $e$.

The arrangement according to the invention can be used for distributing the load in all plants where synchronous machines are connected to a network which dictates the rhythm and is applicable to both generators and motors. It is also suitable for converter plants, particularly for the distribution of power with network couplings.

The arrangement illustrated in the drawing is only one of the several ways in which the invention can be realized in practice. The differential gearing $p$ can for instance be replaced by another design of gearing. It can also be entirely omitted if the stator of the synchronous machine $o$ were made rotatable so that its position depends on the regulator $r$.

I claim:

1. A synchronous electrical machine adapted to be operated in parallel with another functionally similar machine in an alternating current network, said machine comprising stator windings for connection to an alternating current network, a closed rotor winding having tapped connections to a commutator, brushes engaging said commutator and mounted on a rotatable brush yoke, circuit means for connecting said brushes to a direct current source, means for synchronously rotating said brush yoke, and means for displacing said brushes angularly with respect to the rotating magnetic axis of the rotating field of the stator windings to regulate the load on said machine.

2. A synchronous electrical machine as recited in claim 1, wherein said circuit means comprises slip rings rotatable with said brushes, and stationary brushes engaging said slip rings.

3. A synchronous electrical machine as recited in claim 1 wherein said means for displacing said brushes comprises a mechanical motion transmission system for advancing or retarding the rotation of the brush yoke, and a synchronous motor energized from the said alternating current network for actuating said motion transmission system.

4. A synchronous electrical machine as recited in claim 1 wherein said means for displacing said brushes comprises a mechanical motion transmission system for advancing or retarding the rotation of the brush yoke, a synchronous motor energized from the said alternating current network for actuating said motion transmission system, said motor having a lesser number of poles than said machine, said motion transmitting system including speed reduction gearing having a ratio of transmission equal to the ratio of the number of poles of the motor and the electrical machine.

5. A synchronous electrical machine as recited in claim 1 wherein said means for displacing said brushes comprises a mechanical motion transmission system for advancing or retarding the rotation of the brush yoke, and a synchronous motor energized from the said alternating current network for actuating said motion transmission system, said motion transmitting system including a differential gearing.

6. A synchronous electrical machine as recited in claim 1 wherein said means for displacing said brushes comprises a mechanical motion transmission system for advancing or retarding the rotation of the brush yoke, and a synchronous motor energized from the said alternating current network; said motion transmitting system including a differential gearing having axially spaced drive gears connected respectively to said motor and to said brush yoke, idler gears meshing with said first gears and supported by a housing adjustable angularly about the axis of the drive gears, and regulator means for adjusting said housing.

7. A synchronous alternating current generator having stator windings for connection to a network, a closed rotor winding having tapped connections to a commutator, brushes engaging said commutator and mounted on a rotatable brush yoke, circuit means for connecting said brushes to a direct current source, means for synchronously rotating said brush yoke, a gear rotatable with the brush yoke and meshing with a gear connected to a drive gear of a differential gearing, said differential gearing including a second drive gear and a rotatable housing carrying idler gears meshing with both drive gears, and a synchronous motor energized from said network for rotating the second drive gear.

8. A synchronous alternating current generator having stator windings for connection to a network, a closed rotor winding having tapped connections to a commutator, brushes engaging said commutator and mounted on a rotatable brush yoke, circuit means for connecting said brushes to a direct current source, means for synchronously rotating said brush yoke, a gear rotatable with the brush yoke and meshing with a gear connected to a drive gear of a differential gearing, said differential gearing including a second drive gear and a rotatable housing carrying idler gears meshing with both drive gears, a synchronous motor energized from said network for rotating the second drive gear, and regulator means including a motor for rotating the housing of said differential; said regulator means motor having opposed exciting windings, means connecting one exciting winding to said generator stator winding to establish in that exciting winding a current that varies with the effective load current of the generator, and means adjustable to establish a preselected current in the opposed exciting winding.

ROBERT KELLER.

REFERENCES CITED

The following references are of record in the file of this patent:

UNITED STATES PATENTS

| Number | Name | Date |
|---|---|---|
| 2,345,805 | Gibson | Apr. 4, 1944 |
| 1,526,613 | Stephenson | Feb. 17, 1925 |
| 1,558,937 | Slepian | Oct. 27, 1925 |